United States Patent (10) Patent No.: US 11,108,895 B2
Mok et al. (45) Date of Patent: Aug. 31, 2021

(54) METHOD FOR PROVIDING PATH SIGNAL OVERHEAD IN THE 64B/66B CHARACTER STREAM OF AN ITU-T METRO TRANSPORT NETWORK USING MICRO-PACKETS

(71) Applicant: Microchip Technology Inc., Chandler, AZ (US)

(72) Inventors: Winston Mok, Vancouver (CA); Steven Scott Gorshe, Beaverton, OR (US)

(73) Assignee: Microchip Technology Inc., Chandler, AZ (US)

( * ) Notice: Subject to any disclaimer, the term of this patent is extended or adjusted under 35 U.S.C. 154(b) by 90 days.

(21) Appl. No.: 16/562,994

(22) Filed: Sep. 6, 2019

(65) Prior Publication Data
US 2021/0058496 A1 Feb. 25, 2021

Related U.S. Application Data

(60) Provisional application No. 62/891,134, filed on Aug. 23, 2019.

(51) Int. Cl.
*H04L 12/26* (2006.01)
*H04L 29/06* (2006.01)
*H04L 29/08* (2006.01)

(52) U.S. Cl.
CPC ............ *H04L 69/22* (2013.01); *H04L 69/324* (2013.01)

(58) Field of Classification Search
None
See application file for complete search history.

(56) References Cited

U.S. PATENT DOCUMENTS

| 9,337,960 | B2 | 5/2016 | Zhong | |
|---|---|---|---|---|
| 10,218,823 | B2 | 2/2019 | Gareau | |
| 10,397,088 | B2 | 8/2019 | Gareau | |
| 10,797,816 | B1* | 10/2020 | Gorshe | H04J 3/1664 |
| 2014/0149821 | A1* | 5/2014 | Zhou | H03M 13/09 714/758 |
| 2015/0117177 | A1* | 4/2015 | Ganga | H04L 1/1621 370/216 |
| 2016/0020872 | A1* | 1/2016 | Zhong | H04L 69/323 341/87 |
| 2016/0315634 | A1* | 10/2016 | Mei | H03M 13/616 |

(Continued)

OTHER PUBLICATIONS

Yang, Jian, Betts, Malkolm, Gu, Yuan, "SCL OAM solution", ITU-T WD11-65 Submission, International Telecommunication Union, Geneva, Switzerland, Jun. 2018.

(Continued)

*Primary Examiner* — Brandon M Renner
(74) *Attorney, Agent, or Firm* — Glass & Associates; Kenneth Glass

(57) ABSTRACT

A method for extracting path overhead (POH) data blocks from a data stream in a 64B/66B-block communication link, the method includes receiving at a sink node a data stream in a 64B/66B-block communication link, detecting within the data stream at a PCS sublayer a micro-packet starting with an /S/ control block, including K POH data blocks, and ending with a /T/ control block, extracting the micro-packet from the data stream, and extracting the POH data blocks from the micro-packet.

15 Claims, 7 Drawing Sheets

MTN micro-packet inserted into the IPG region

(56) References Cited

U.S. PATENT DOCUMENTS

| | | | | |
|---|---|---|---|---|
| 2018/0145928 A1* | 5/2018 | Zhong | ............... | H04L 47/2491 |
| 2019/0097758 A1* | 3/2019 | Huang | ................... | H04L 45/66 |
| 2020/0067827 A1* | 2/2020 | Mei | ..................... | H04J 3/1658 |
| 2020/0287998 A1* | 9/2020 | Gorshe | ............... | H04L 1/0057 |
| 2020/0296486 A1* | 9/2020 | Xiang | ................... | H04B 10/27 |

OTHER PUBLICATIONS

ITU-T G.8013/Y.1731, "Operation, administration and maintenance (OAM) functions and mechanisms for Ethernet-based networks", International Telecommunication Union, Geneva, Switzerland, Aug. 2015.

Trowbridge, Steve, "G.mtn Section and Path Overhead Options," ITU-T WD11-10 Submission, International Telecommunication Union, Geneva, Switzerland, Apr. 2019.

Eyal Oren "MTN Section Layer frame and Path layer format considerations;", C152211, ITU-T Draft; Study Period 2017-2020; Study Group 15; Seri Es C1522, International Telecommunication Union, Geneva • CH, vol. 11/15 Jun. 18, 2019 (Jun. 18, 2019), pp. 1-4, XP044270354, Retrieved from the Internet: URL: https://www.itu.int/ifa/t/2017/sg15/do cs/c/ties/T17-SG15-C-1522!!MSW-E.docx [retrieved on Jun. 18, 2019] Section 2.

International Search Report and Written Opinion, PCT/US2019/061437, dated Apr. 7, 2020.

Qiwen Zhong et al: "Analysis for IPG based G.mtn path layer OAM insertion impact on IEEE 802.3 PCS state machine;C1195", ITU-T Draft; Study Period 2017-2020; Study Group 15; Series C1195, International Telecommunication Union, Geneva ; CH, VO I. 11/15 Jun. 18, 2019 (Jun. 18, 2019), pp. 1-6, XP044270155, Retrieved from the Internet: URL:https://www.itu.int/ifa/t/2017/sg15/do cs/c/ties/T17-SG15-C-1195!!MSW-E.docx [retrieved on Jun. 18, 2019] Section 2.2, 2.3.

Qiwen Zhong et al: "Discussion and proposal for G.mtn terminologies regarding Ethernet client signal ;WDII-39", ITU-T Draft; Study Period 2017-2020; Study Group 15; Series WDII-39, International Telecommunication Union, Geneva ; CH, VO I. 11/15 Apr. 1, 2019 (Apr. 1, 2019), pp. 1-10, XP044264678, Retrieved from the Internet: URL:https://www.itu.int/ifa/t/2017/sq15/ex change/wp3/q11/2019-04-Xian/WD11-39-Huawei-CMCC-Discussion and proposal for G.mtn terminologies.docx [retrieved on Apr. 1, 2019] Section 2.1; figure 2.

Steve Gorshe, "Analysis of the G.mtn A.1 Scope Relative to IEEE 802.3 Clause 82 State Diagrams;C1179", ITU-T Draft; Study Period 2017-2020; Study Group 15; Series C1179, International Telecommunication Union, Geneva ; CH, VO I. 11/15 Jun. 18, 2019 (Jun. 18, 2019), pp. 1-11, XP044270147, Retrieved from the Internet: URL:https://www.itu.int/ifa/t/2017/sq15/do cs/citiesiT17-SG15-C-1179!!MSW-E.docx [retrieved on Jun. 18, 2019], figure 6.

Ximing Dong CICT PR China: "Feasibility Analysis: the Use of Idle as a Resources to Carry Path layer OAM; WDII-16", ITU-T Draft; Study Period 2017-2020; Study Group 15; Series WDII-16, International Telecommunication Union, Geneva ; CH, VO I. 11/15, Apr. 1, 2019 (Apr. 1, 2019), pp. 1-6, XP044264659, Retrieved from the Internet: URL:https://www.itu.int/ifa/t/2017/sg15/ex change/wp3/qll/2019-04-Xian/WD11-16-CICT-CIC-Feasibility Analysis the Use of Idle Resources as OAM Canrier.docx [retrieved on Apr. 1, 2019].Section 2.1.

* cited by examiner

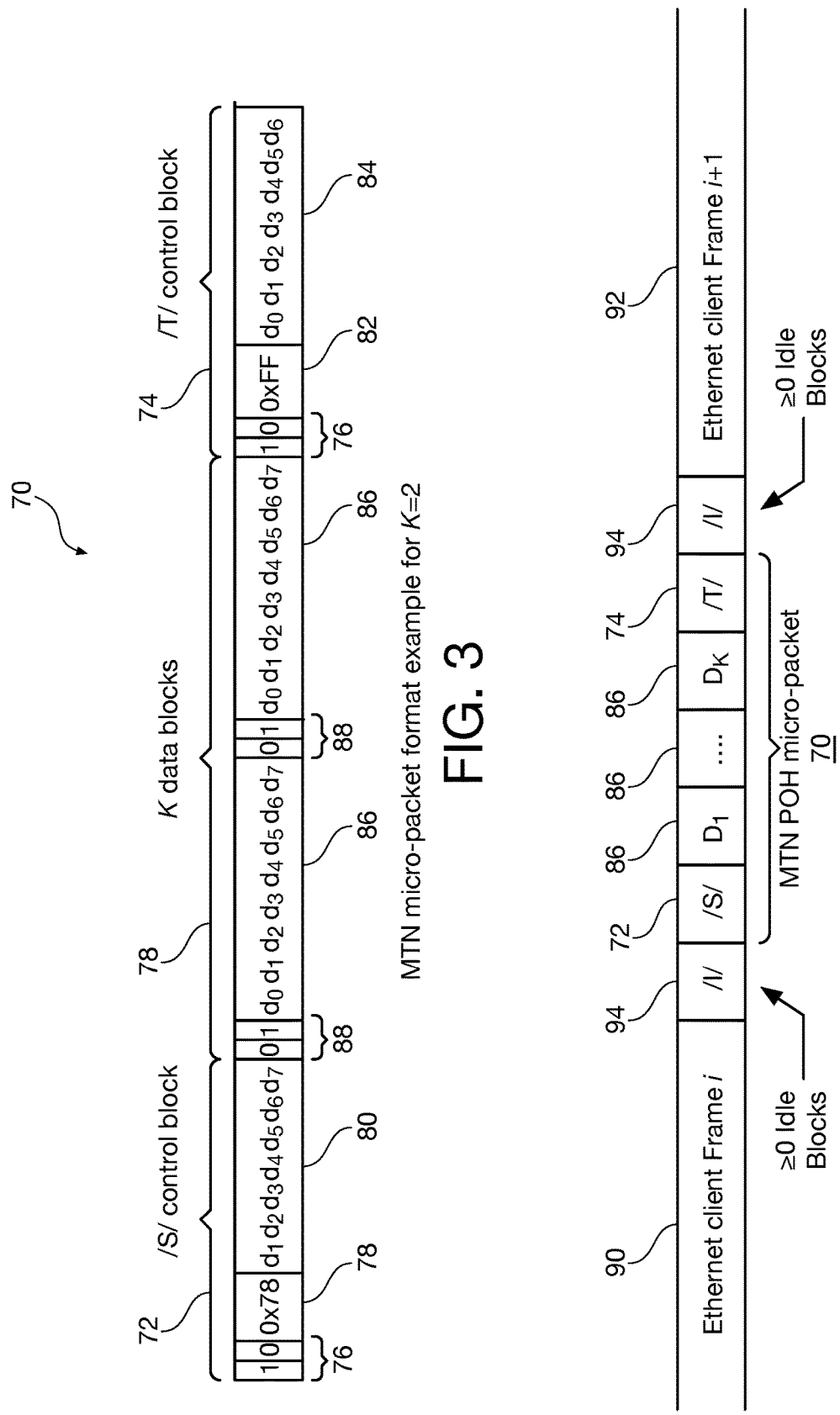

| Average Number of 66-bit blocks Between POH Micro-packets | Average Time Interval Between POH Micro-packets (µS) | K = 2 POH data blocks ||
|---|---|---|---|
| | | POH Bandwidth Impact (ppm) | POH payload Bandwidth capacity (kbit/s) |
| 16384 | 216 | 244 | 1111 |
| 32768 | 433 | 122 | 554 |
| 65536 | 865 | 61 | 277 |
| 131072 | 1730 | 31 | 138 |

Note: These time interval and bandwidth values assume that the POH is inserted into a 5 Gbit/s MTN Path stream

FIG. 5

METHOD FOR PROVIDING PATH SIGNAL OVERHEAD IN THE 64B/66B CHARACTER STREAM OF AN ITU-T METRO TRANSPORT NETWORK USING MICRO-PACKETS

This application claims priority to U.S. Provisional Patent Application Ser. No. 62/891,134, filed on Aug. 23, 2019, the contents of which are expressly incorporated by reference herein in their entirety.

FIELD OF THE INVENTION

The present invention relates to ITU-T transport networks. More particularly, the present invention relates to methods for providing path signal overhead in the 64b/66b character stream of an ITU-T metro transport network.

BACKGROUND

The ITU-T Metro Transport Network (MTN) scope requires that "The path layer provides flexible connections that carry client data and path OAM in 64B/66B blocks that are conformant to IEEE 802.3 clause 82 encoding rules and results in valid 802.3 64B/66B blocks, which allows using the lower layers of the Ethernet protocol stack." "Path OAM (Operations, Administrations, and Maintenance) Overhead" is abbreviated to Path Overhead (POH) here. Since the minimum Ethernet packet length is 64 bytes, plus 8 bytes of preamble and packet start indication, and at least 8 bytes of Idle characters in the inter-packet gap (IPG), sending the POH in separate full Ethernet packets requires excessive bandwidth and can interfere with the client packets. Using normal Ethernet packets is also very bandwidth inefficient, since 22 bytes of the packet are used by packet overhead functions.

Previous proposals to the ITU-T carried the POH in a new type of 64B/66B Ordered set block, with or without additional data blocks associated with the Ordered set block. These Ordered set block-based approaches work if the MTN POH remains in its proper layer below the Ethernet Transmit and Receive functions. However, some ITU-T participants desire to also use the Ethernet Transmit and Receive functions as part of the inter-packet Idle insertion/deletion process. This approach to Idle insertion/deletion creates the problem that the Ethernet Transmit and Receive functions perform checks for valid block types and sequences, and consequently strict adherence to IEEE 802.3 requires these functions to convert a non-Ethernet Ordered set block to an error block. There is a need for a bandwidth-efficient method of carrying MTN POH that is transparent to all Ethernet layers below the Medium Independent Interface (MII) such that no Physical Coding Sublayer functions require modifications.

As indicated above, an earlier proposal to the ITU-T Q11/15 standard group was to provide POH by carrying it inside Ordered set blocks, inserted into the stream on a quasi-regular basis. Another earlier proposal to the ITU-T was to provide POH by periodically inserting a combination of an Ordered set block and recognizable data blocks. However, as indicated above, ordered set approaches are not guaranteed to work with some types of IPG Idle insertion/deletion implementations.

BRIEF DESCRIPTION

The MTN Path layer is effectively a sub-layer "shim" that sits within an IEEE 802.3 Physical Coding Sublayer (PCS). At the transmitter, the MTN Path layer receives an IEEE 802.3 clause 82-compliant 64B/66B-encoded Ethernet client data stream, adds POH and outputs the stream to a section layer that the reuses elements of the Optical Internetworking Forum (OIF) "FlexE" shim. The receiver MTN shim reverses the process. The present invention includes components in both the transmitter and receiver and exploits the fact that MTN POH is not forwarded to any Ethernet layers above the MII.

Ethernet packet processing, including checking for 64 Byte minimum Ethernet packet length, is performed at the Ethernet MAC layer above the MII. As long as MTN POH is added and removed below the MAC layer (preferably below the MII), the Ethernet MAC is not impacted. Consequently, MTN POH can be inserted between Ethernet client packets as long as: 1) the POH is recognizable such that it can be removed by the MTN Path sink node; 2) the bandwidth required by the POH is small enough to be accommodated by deleting inter-packet Idles (e.g., deleting on average one Idle block per 16 k blocks of the stream); 3) the MTN POH format is transparent to the Ethernet Transmit and Receive functions; and 4) the MTN POH format is transparent to intermediate MTN nodes.

In accordance with the present invention, the POH is carried in short (e.g., 32-byte) "micro-packets" that are inserted between Ethernet client packets. The micro-packets each adhere to the above-listed requirements. Bandwidth efficiency is achieved by only using 2 bytes for Ethernet packet overhead for these micro-packets and not adding the preamble or IPG Idles. Specifically, it begins with the normal /S/ control block and ends with the /T/ control block, which achieves the above-listed transparency requirements.

In accordance with an aspect of the invention, a method for extracting path overhead (POH) data blocks from a data stream in a 64B/66B-block communication link includes receiving at a sink node a data stream in a 64B/66B-block communication link, detecting within the data stream at a PCS sublayer a micro-packet starting with an /S/ control block, including K POH data blocks, and ending with a /T/ control block, the micro-packet having a length shorter than a minimum length for an Ethernet packet, extracting the micro-packet from the data stream, and extracting the POH data blocks from the micro-packet.

In accordance with an aspect of the invention, the method further includes extracting POH data from byte fields in the /S/ control block and the /T/ control block.

In accordance with an aspect of the invention, detecting within the data stream at the PCS sublayer the micro-packet includes further incudes one of: detecting a type 0x78 control block followed by K data blocks that are followed by a type 0xFF control block, detecting a packet including a signature that is different from an Ethernet signature, and detecting a packet having a length shorter than the minimum length for an Ethernet packet.

In accordance with an aspect of the invention, detecting a type 0x78 control block followed by K data blocks that are followed by a type 0xFF control block includes detecting a fixed number of K data blocks.

In accordance with an aspect of the invention, detecting a type 0x78 control block followed by K data blocks that are followed by a type 0xFF control block includes detecting a number of K data blocks wherein K can vary between K=0 and K=5.

In accordance with an aspect of the invention, detecting the packet including a signature that is different from an Ethernet signature includes detecting a packet including a cyclic redundancy check (CRC) that is different from an Ethernet CRC.

In accordance with an aspect of the invention, a method for inserting path overhead (POH) data blocks into a data stream in a source node of a 64B/66B-block communication link includes generating an /S/ control block including assembling first POH data into the generated /S/ control block, generating second POH data and assembling the second POH data into K POH data blocks, generating a /T/ control block including assembling third POH data into the generated /T/ control block, assembling the /S/ control block, the K POH data blocks and the /T/ control block into a micro-packet, and inserting the assembled micro-packet into an inter-packet gap in the data stream in the 64B/66B-block communication link.

In accordance with an aspect of the invention, generating K POH data blocks by assembling POH data into K 64B/66B blocks includes generating K POH data blocks by assembling POH data into K 64B/66B blocks where K<6.

In accordance with an aspect of the invention, assembling the K POH data blocks between the /S/ control block and the /T/ control block into a micro-packet further includes including in the micro-packet a signature that is different from an Ethernet signature.

In accordance with an aspect of the invention, including in the micro-packet a signature that is different from an Ethernet signature includes including in the micro-packet a CRC that is different from an Ethernet CRC.

In accordance with an aspect of the invention, the method further includes inserting or deleting idle blocks in the data stream in at least one of a position preceding and following adjacent Ethernet client packets to maintain a data rate in the source node.

In accordance with an aspect of the invention, inserting or deleting idle blocks in the data stream includes inserting or deleting idle blocks in the data stream to match a data rate of the data stream in the source node to a data rate of a section layer connecting the source node to an intermediate node in the 64B/66B-block communication link.

In accordance with an aspect of the invention, an apparatus for extracting path overhead (POH) data blocks from a data stream in a 64B/66B-block communication link, includes circuitry for receiving at a sink node a data stream in a 64B/66B-block communication link, circuitry for detecting within the data stream at a PCS sublayer a micro-packet starting with an /S/ control block, including K POH data blocks, and ending with a /T/ control block, the micro-packet having a length shorter than a minimum length for an Ethernet packet, a circuit for extracting the micro-packet from the data stream, and a circuit for extracting the POH data blocks from the micro-packet.

In accordance with an aspect of the invention, the apparatus further includes a circuit for extracting POH data from byte fields in the /S/ control block and the /T/ control block.

In accordance with an aspect of the invention, the circuit for detecting within the data stream at the PCS sublayer the micro-packet includes one of: a circuit for detecting a type 0x78 control block followed by K data blocks that are followed by a type 0xFF control block, a circuit for detecting a packet including a signature that is different from an Ethernet signature, and a circuit for detecting a packet having a length shorter than the minimum length for an Ethernet packet.

In accordance with an aspect of the invention, an apparatus for inserting path overhead (POH) data blocks into a data stream in a source node of a 64B/66B-block communication link includes a circuit for generating K POH data blocks by assembling POH data into K 64B/66B blocks, a circuit for generating an /S/ control block including generating first POH data, a circuit for generating a /T/ control block including generating second POH data, a circuit for generating third POH data, a circuit for assembling the third POH data into K POH data blocks between the /S/ control block and the /T/ control block into a micro-packet, and a circuit for inserting the micro-packet into an inter-packet gap in the data stream in the 64B/66B-block communication link.

In accordance with an aspect of the invention, the circuitry for generating K POH data blocks by assembling POH data into K 64B/66B blocks includes a circuit for generating K POH data blocks by assembling POH data into K 64B/66B blocks where K<6.

BRIEF DESCRIPTION OF THE DRAWING FIGURES

The invention will be explained in more detail in the following with reference to embodiments and to the drawing in which are shown:

FIG. 3 is a diagram showing a representative MTN micro-packet format example using 2 POH data blocks;

FIG. 4 is a diagram showing the MTN micro-packet of FIG. 2 inserted into the inter-packet gap (IPG) region of an Ethernet client packet data stream;

FIG. 5 is a table showing examples of tradeoffs for POH bandwidth, latency, and PHY rate increase;

Figure 10:
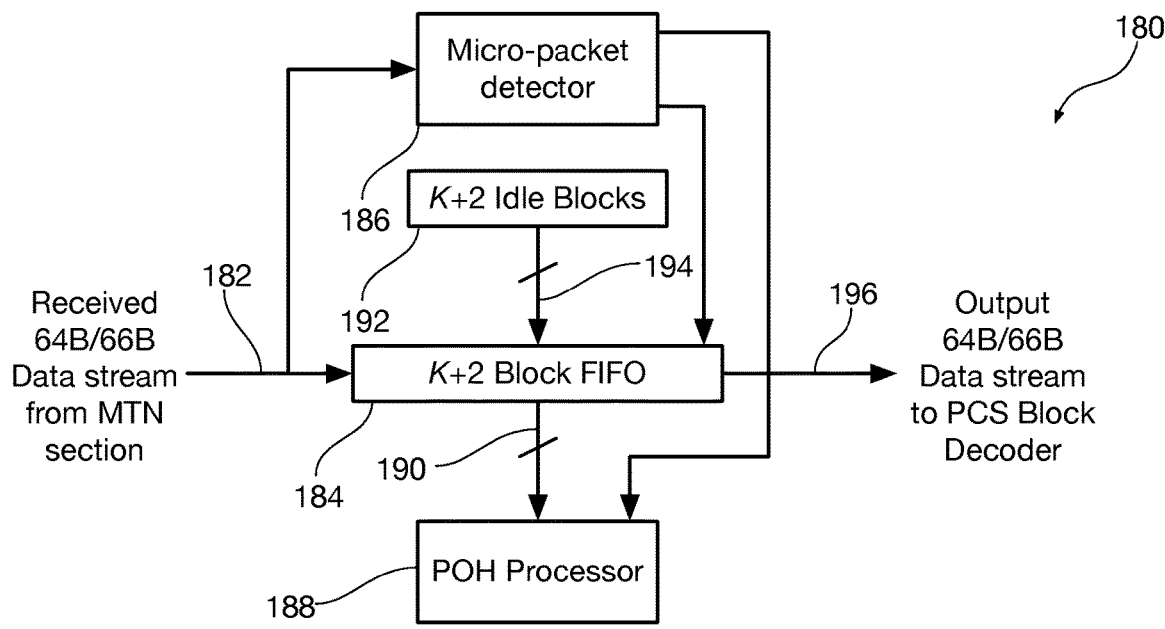
Figure 11:
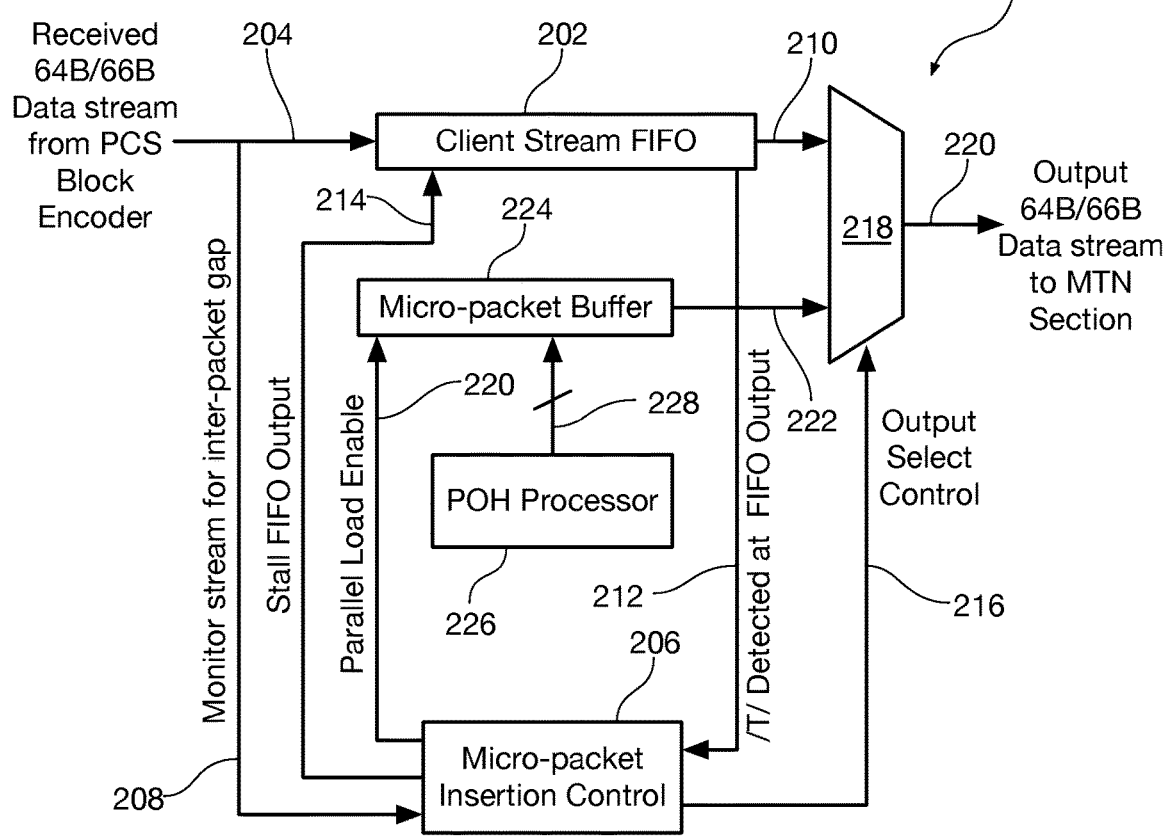

FIG. 10 is a block diagram of an illustrative apparatus for extracting path overhead (POH) data blocks from a data stream in a 64B/66B-block communication link in accordance with an aspect of the invention; and FIG. 11 is a block diagram of an illustrative apparatus for inserting path overhead (POH) data blocks into a data stream in a source node of a 64B/66B-block communication link in accordance with an aspect of the invention.

DETAILED DESCRIPTION

Persons of ordinary skill in the art will realize that the following description is illustrative only and not in any way limiting. Other embodiments will readily suggest themselves to such skilled persons.

Figure 1:
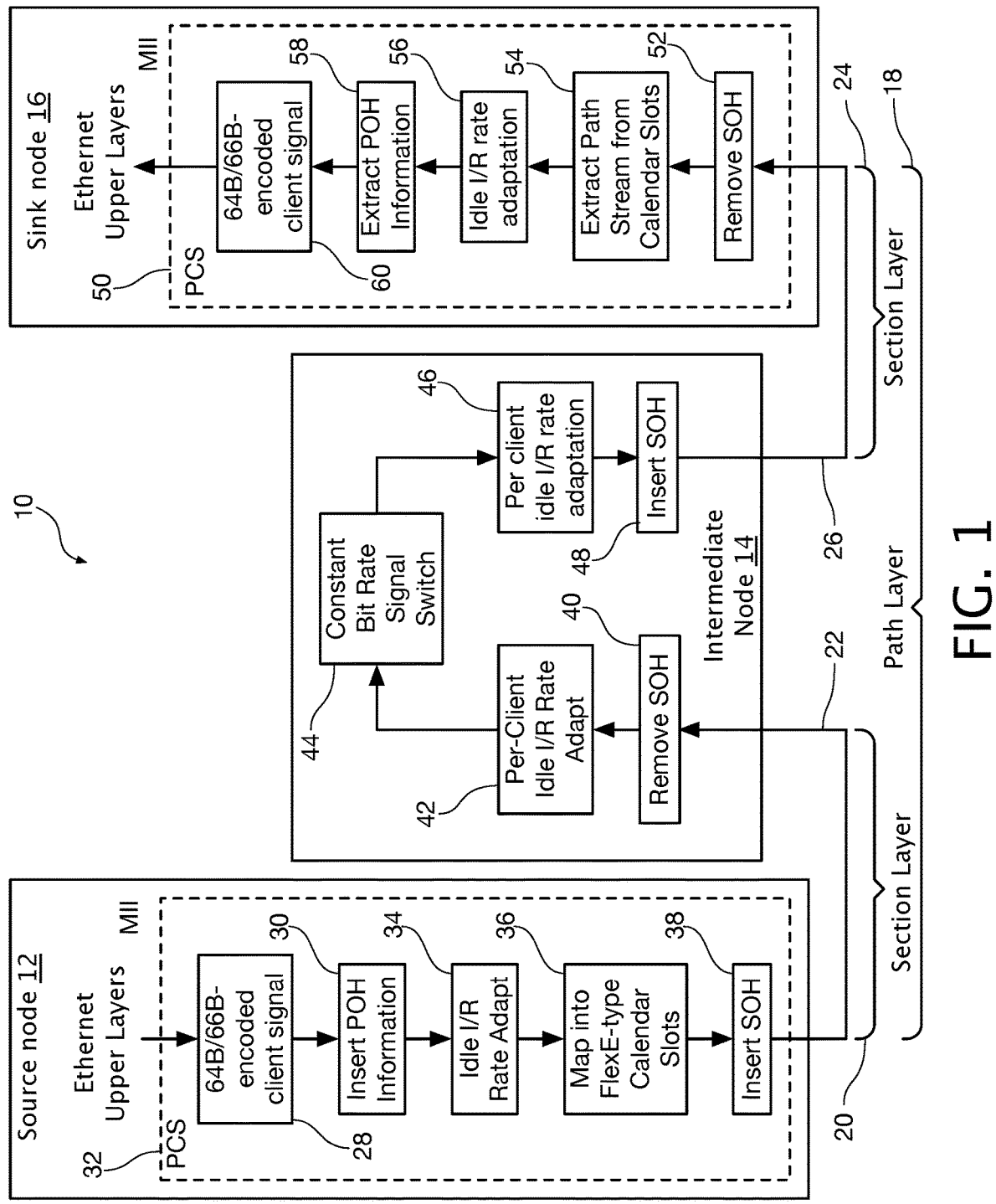
FIG. 1 is a block diagram showing a basic network illustration for providing path signal overhead in the 64b/66b character stream of an ITU-T metro transport network in the environment of the present invention.

Referring now to FIG. 1, a block diagram shows how the present invention is situated in an ITU-T metro transport network 10. The metro transport network 10 is shown having a representative source node 12, an intermediate node 14 and a sink node 16. Information blocks originating in the source node 12 pass through the intermediate node 14 to the sink node 16 over a path layer indicated at reference numeral 18.

The information blocks pass between the source node 12 and the intermediate node 14 over a section layer 20 through a connection 22 and pass between the intermediate layer 14 to the sink layer 16 over a section layer 24 through a connection 26. The timing and operation of the ITU-T metro transport network 10 depicted in FIG. 1 is known except for the differences noted herein that implement the present invention.

The MII in source node 12 provides an Ethernet client packet stream, which is 64B/66B encoded to create the client signal at reference numeral 28. POH information is inserted at reference numeral 30 into this signal within the PCS layer of the source node 12 (indicated within dashed lines 32). The POH information is inserted at reference numeral 30 in accordance with an aspect of the present invention in the manner that will be discussed with reference to FIGS. 3 and 4.

Figure 2:
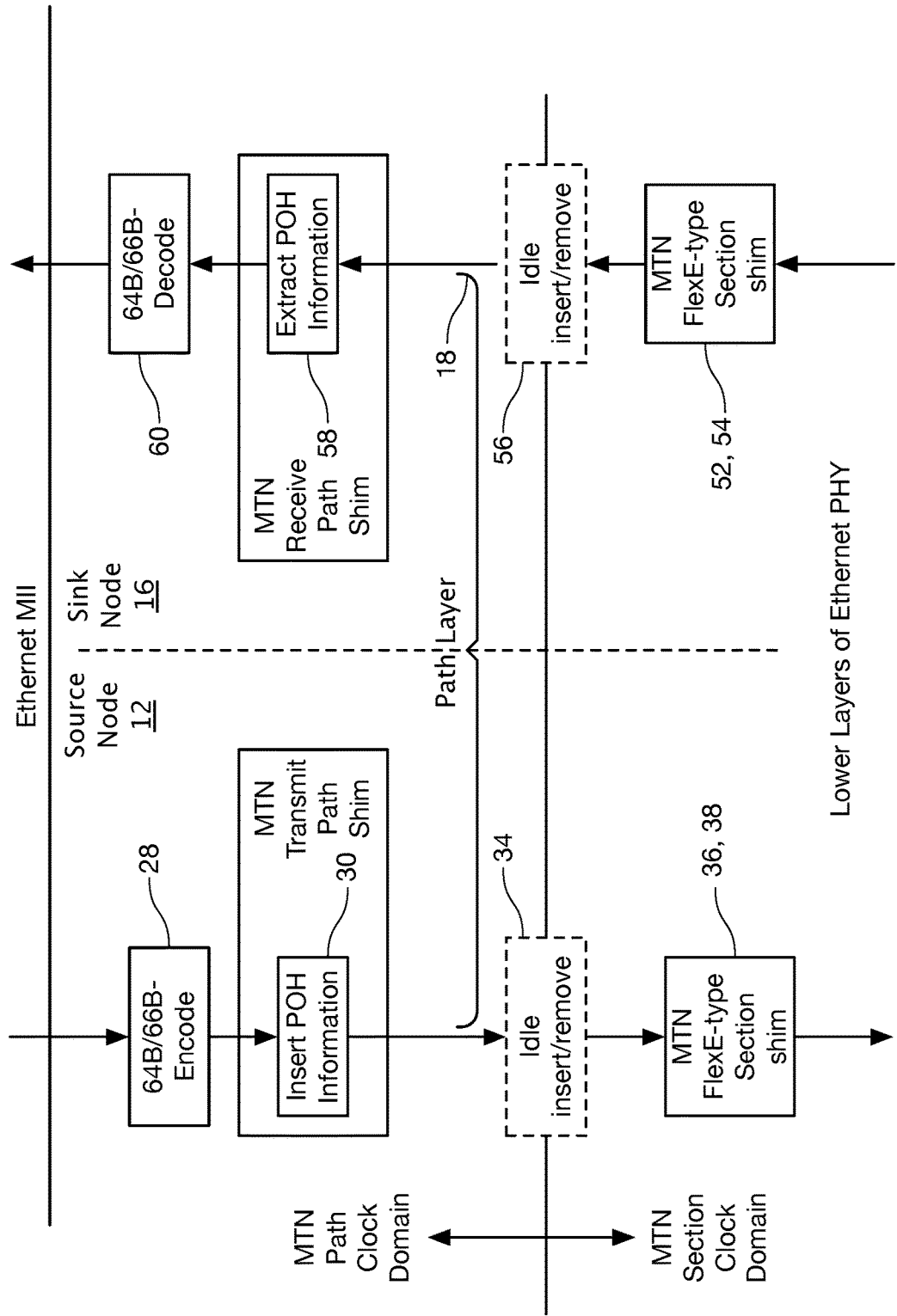
FIG. 2 is a diagram illustrating how the present invention resides within the layers of a 64B/66B character stream of an ITU-T metro transport network.

At reference numeral 34 idle blocks are inserted into, or removed from, the data stream that includes the 64B/66B encoded client signal and the inserted POH information to adapt the rate of the data stream to the rate of the MTN section calendar slots as is known in the art. This rate adaptation is done because the data stream rate and the calendar slot rate are determined in different clock domains. The MTN Path Clock Domain and the MTN Section Clock Domain shown in FIG. 2 are independent of one another. At reference numeral 36 the 64B/66B encoded client signal blocks are mapped into MTN Section calendar slots as is known in the art. At reference numeral 38, section layer overhead (SOH) is inserted into the data stream to monitor the performance of section layer 20 as is known in the art. The resulting data stream is then transmitted across the section layer to the intermediate node 14 via connection 22. The operations performed at reference numerals 34, 36, and 38 is completely independent of the content of the 64B/66B encoded signal in the data stream.

When the data stream arrives at the intermediate node 14 the SOH that was inserted in the source node at reference numeral 38 is removed from the data stream at reference numeral 40. At reference numeral 42 idle blocks are inserted, or removed, to match the data rate of the received data stream to the data rate of the connection through the constant bit rate signal switch 44 to which the rate adapted data stream is then sent. The data stream that is intended to be sent to the sink node 16 is then provided to reference numeral 46 where idle blocks are inserted or removed to match the data rate of the data stream to the rate of the MTN Section calendar slots of the section layer 24. Those skilled in the art will recognize that if data rate of switch 44 is locked to the data rate of section layer 24, the rate adaptation provided by reference numeral 46 is not required. At reference numeral 48 SOH is inserted into the data stream to monitor the performance of the section layer 24. The resulting data stream is then transmitted to the sink node 16 at the data rate of the section layer 24 over the connection 26.

The operation of the intermediate node 14 is independent of the present invention in that the data format of the present invention is transparent to the operation of the intermediate node 14. The fact that implementation of the present invention in the operation of the ITU-T metro transport network 10 is completely transparent is, in itself, an aspect of the present invention.

At the PCS level of the sink node 16 (indicated at reference numeral 50) the SOH is removed from the data stream at reference numeral 52. At reference numeral 54 the path stream is extracted from the MTN Section calendar slots and at reference numeral 56 idle blocks are inserted, or removed as necessary to adapt the rate of the data stream to the local clock rate of the sink node 16. The operation of the sink node at reference numerals 52, 54, and 56 is in accordance with the protocol of the ITU-T metro transport network 10 and is thus well known in the prior art. The operations performed at reference numerals 50, 52, and 54 is completely independent of the content of the 64B/66B encoded signal in the data stream.

At reference numeral 58, the POH information, inserted at reference number 30, is extracted from the data stream to recover the 64B/66B encoded client signal at reference numeral 60. The 64B/66B encoded signal is then passed to the MII interface in the sink node 16.

Referring now to FIG. 2, it may be seen that the MTN Path layer 18 is essentially a shim (an in-line functional block with low complexity/functionality that is added to a layer or sub-layer) within an IEEE 802.3 PCS. Its upper layer interface in both the source node 12 and the sink node 16 is a clause 82-compliant 64B/66B-encoded Ethernet client data stream, and its lower layer interfaces in both the source node 12 and the sink node 16 is an MTN Section layer that the reuses elements of the OIF "FlexE" shim Consequently, the MTN Path shim transmitter is free to add any POH blocks to the data stream subject to three constraints. First, the POH blocks must be transparent to both the FlexE-type MTN Section layer and PCS functions along the path layer 18 so that they are guaranteed to reach the MTN Path shim receiver. Second, the POH information in the stream from the MTN Path shim transmitter must be reliably recognizable by the MTN Path shim receiver such that the MTN Path shim receiver can extract and remove the POH before passing the restored 64B/66B block stream toward the Ethernet MAC layer. Third, the bandwidth required to transmit the POH must be small enough that it can be derived by deleting IPG Idles rather than increasing the Ethernet PHY rate.

In accordance with the present invention, as illustrated in FIG. 4, the transmitter inserts the POH into the IPG region between Ethernet client packets at the desired long-term average rate. The POH is contained in a "micro-packet" 70 that conforms to the Ethernet Transmit and Receive state diagram block sequence rules. Using such a micro-packet between Ethernet packets ensures full POH transparency to all PCS functions. Unlike an actual Ethernet packet, preferably all data bytes in the micro-packet are used for carrying POH information rather than being used for Ethernet packet overhead.

As illustrated in FIG. 3, the micro-packet 70 starts with a /S/ block 72 and ends with a /T/ block 74, each of which are identified as a control block designated by the "10" shown in the first bit positions at reference numeral 76. The /S/ block 72 is an Ethernet control block type 0x78 as indicated at reference numeral 78 and includes 7 data bytes indicated collectively at reference numeral 80. The /T/ block 74 is an Ethernet control block type 0xFF as indicated at reference numeral 82 and includes 7 data bytes indicated collectively at reference numeral 84. The micro-packet 70 includes K POH data blocks 86 between the /S/ block 72 and the /T/ block 74, each identified as a data block designated by the "01" shown in the first bit positions at reference numeral 88. Persons of ordinary skill in the art will appreciate that the /S/ control block+Data+/T/ control block sequence is the usual legal Ethernet block sequence, which is what makes the micro-packet transparent to other PCS functions. K can either be chosen as a fixed constant value, or can be varied between K=0 and K=5, depending on the amount information that needs to be sent at that micro-packet occurrence.

FIG. 3 shows an instance where K=2. Since the /S/ and /T/ blocks 72 and 74 each contain 7 data bytes as indicated at reference numerals 80 and 84, respectively, the micro-packet capacity for carrying POH information is: 7+7+8K, where "K" is the number of data blocks 78 in the micro-packet 70. For example, a micro-packet 70 having k=2 data blocks contains 30 data bytes for POH information. The value of K is chosen based on tradeoffs between the required POH bandwidth, the required POH report latency, and the amount of associated required transmission bandwidth, which is provided by either increasing the PHY rate or removing IPG Idles. See FIG. 5 for an example of these tradeoffs. For example, for a 5 Gbit/s calendar slot channel, if we use k=2 data blocks and the average spacing between micro-packets is $2^{16}$=65536 blocks, then the average time between micro-packets is:

(65536×66 bits)/(5 Gbit/s)=865 microseconds and the available bandwidth for POH information is:

[(30 bytes/micro-packet)×(8 bits/byte)]/(865 microseconds)=277 Kbit/s

In the absence of transmission channel errors, the MTN Path sink will detect the micro-packet 70 based on its format. As shown in FIG. 3, the micro-packet is readily detectable as a type 0x78 control block 72 followed by K data blocks 78 that are followed by a type 0xFF control block 74. For K<6, the micro-packet is shorter than the minimum Ethernet packet length, and hence distinguishable from all Ethernet client packets. The detection capability of the network for the micro-packet 70 can be further enhanced or simplified by including a signature such as using a CRC that is different from the Ethernet CRC, e.g., by using a different generator polynomial to create the CRC value.

Referring now to FIG. 4, a diagram shows how a micro-packet 70 may be included in a data stream in between a first Ethernet client packet i at reference numeral 90 and a second Ethernet client packet 1+1 at reference numeral 92. The micro-packet 70 may be preceded by ≥0 idle blocks shown at reference numeral 94 and followed by ≥0 idle blocks shown at reference numeral 94. The micro-packet 70 is shown as beginning with /S/ block 72, ending with a /T/ block 74, and including K POH data blocks 86 designated as $D_1$ through $D_K$.

A fundamental aspect of MTN is that all of its operations are performed within the PCS layer (reference numerals 30 and 50, respectively, in the source node 12 and sink node 16 of FIG. 1), below the MAC sub-layer. The micro-packet 70 is a legal Ethernet packet with respect to the PCS functions, since packet length and format checks are only performed at the MAC sub-layer. Consequently, no MTN intermediate node 14 (FIG. 1) will need to detect the presence of a micro-packet 70 or distinguish between it and Ethernet client packets. The MTN Path sink node 16 detects and removes the micro-packets within the PCS at reference numeral 58 of FIG. 1 such that they never appear at the receiver MAC. Since only the MAC performs format and minimum length checks on Ethernet packets, the use of micro-packets in MTN Path has no impact on the Ethernet client layers.

Because the micro-packets 70 are located in the IPG regions, the simplest and preferred method to accommodate the POH bandwidth is for the source node 12 to delete an appropriate average number of IPG Idle blocks. Alternatively, the Ethernet PHY rate can be increased by the average bandwidth associated with the micro-packets 70 containing the POH. The MTN Path sink 16 will effectively restore K+2 Idle blocks when it removes the POH micro-packet of that size.

There are several differences and advantages of the solution of the present invention. Unlike block-based prior art solutions, carrying MTN Path Layer overhead in accordance with the present invention is completely transparent to all IEEE Clause 82 PCS functions both above and below the MTN Path Layer. This transparency is achieved by strictly adhering to Clause 82 block format and block sequence specifications, which was not true of block-based prior art solutions.

Using a recognizable micro-packet 70 allows the packet to be processed within the MTN Path Layer rather than at the Ethernet MAC layer where MTN Path Layer overhead is processed using packet-based prior art solutions. This avoids requiring new additional processing in the Ethernet client layers above the PCS 30 and 50 of FIG. 1.

Since all processing is performed within the MTN Path layer, all available data bytes within the packet are preferably dedicated to carrying MTN Path overhead information rather than Ethernet packet overhead (e.g., Destination and Source Addresses, Packet length and Packet Check Sequence), resulting in significantly higher bandwidth efficiency.

If the MTN POH micro-packet 70 is corrupted such that the MTN Path sink 16 fails to recognize it and remove it, there will be no impact on Ethernet layers above the PCS. It will be discarded in the MAC layer because it violates the minimum Ethernet packet length.

As previously noted, the detection capability of the network for the micro-packet 60 can be further enhanced or simplified by including a signature such as using a CRC that is different from the Ethernet CRC.

Figure 6:
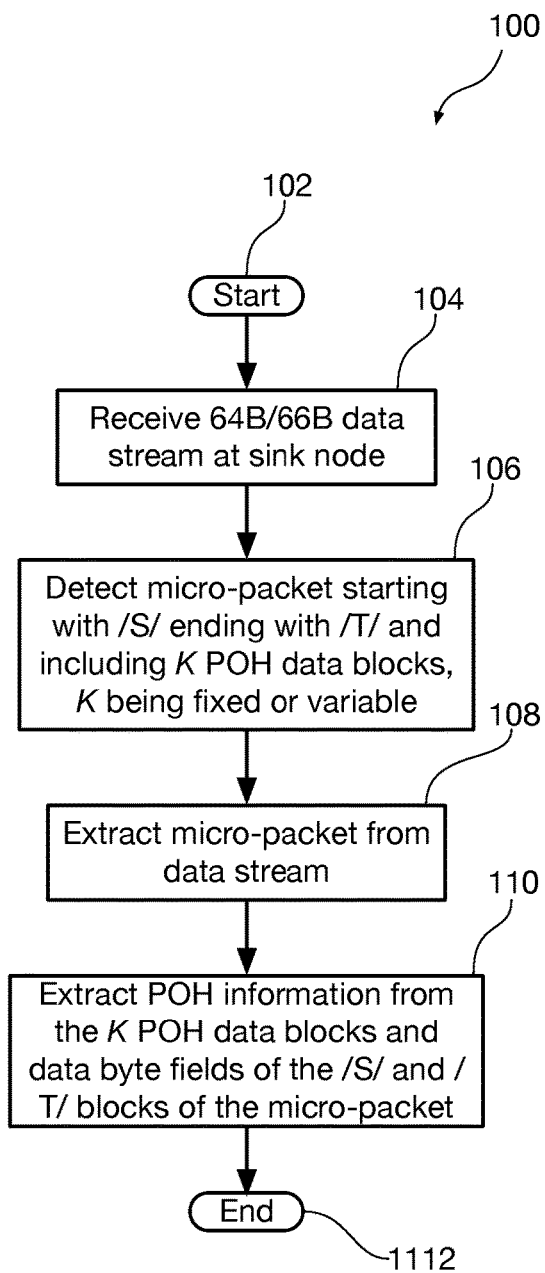
FIG. 6 is a flow diagram showing an illustrative method for extracting path overhead (POH) data blocks from a data stream in a 64B/66B-block communication link in accordance with an aspect of the invention.

Referring now to FIG. 6, a flow diagram shows an illustrative method 100 for extracting path overhead (POH) data blocks from a data stream in a 64B/66B-block communication link in accordance with an aspect of the invention. The method begins at reference numeral 102.

At reference numeral 104, a 64B/66B data stream is received at a sink node. At reference numeral 106, a micro-packet is detected starting with an /S/ control block, ending with a /T/ control block and including K POH data blocks, where K may be fixed or can be varied between K=0 and K=5, depending on the amount information that needs to be sent at that micro-packet occurrence. The /S/ control block and the /T/ control block both include POH data byte fields. At reference numeral 108, the micro-packet is extracted from the data stream.

At reference numeral 110 the POH information is extracted from the K POH data blocks and the data byte fields of the /S/ control block and the /T/ control block. The method ends at reference numeral 122.

Figure 7:
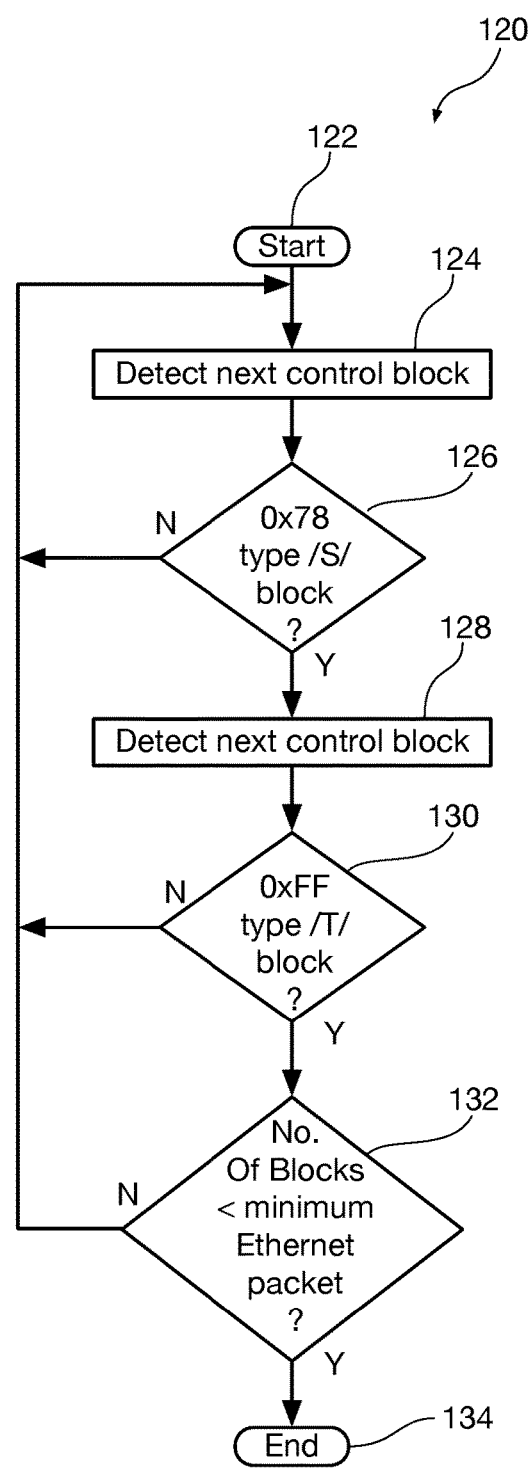
FIG. 7 is a flow diagram showing an illustrative method for detecting a micro-packet in a method such as the one depicted in FIG. 6.

Referring now to FIG. 7, a flow diagram shows a first illustrative method 120 for detecting a micro-packet in a method such as reference numeral 106 of the method 100 depicted in FIG. 6. The method begins at reference numeral 122.

At reference numeral 124, the next control block in the data stream is detected. This may be done by detecting the control block header. At reference numeral 126 it is determined whether the control block detected at reference number 124 is a 0x78 /S/ control block. If the control block is not a 0x78 /S/ control block the method returns to reference numeral 124 where the next control block in the data stream is detected.

If at reference numeral 126 it is determined that the control block is a 0x78 /S/ control block, the method proceeds to reference numeral 128 where the next control block in the data stream is detected. At reference numeral 130 it is determined whether the next control block detected at reference number 128 is a 0xFF /T/ control block. If the next control block is not a 0xFF /T/ control block the method returns to reference numeral 124 where the next control block in the data stream is detected.

If at reference numeral 130 it is determined that the control block is a 0xFF /T/ control block, the method proceeds to reference numeral 132, where it is determined whether the number of blocks including the /S/ control block, the /T/ control block and the number of data blocks in between the /S/ control block and the /T/ control block is less than the minimum number of blocks in an Ethernet packet. If the number of blocks including the /S/ control block, the /T/ control block and the number of data blocks in between the /S/ control block and the /T/ control block is not less than the minimum number of blocks in an Ethernet packet, the method returns to reference numeral 124 where the next control block in the data stream is detected.

If the number of blocks including the /S/ control block, the /T/ control block and the number of data blocks in between the /S/ control block and the /T/ control block is less than the minimum number of blocks in an Ethernet packet, the method ends at reference numeral 134, returning that a micro-packet starting with an /S/ control block, ending with a /T/ control block and including K POH data blocks has been detected.

Figure 8:
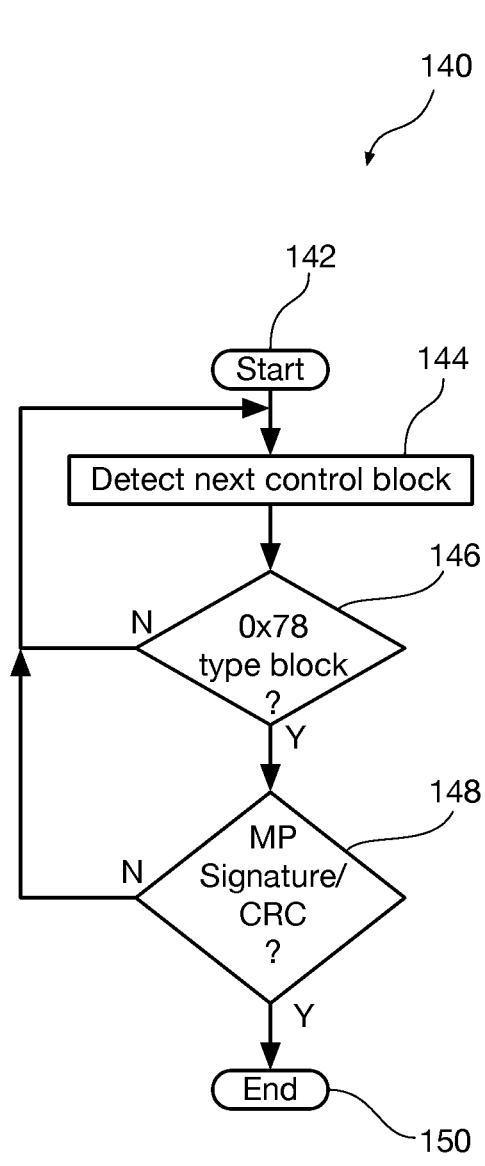
FIG. 8 is a flow diagram showing an illustrative method for detecting a micro-packet in a method such as the one depicted in FIG. 6.

Referring now to FIG. 8, a flow diagram shows a second illustrative method 140 for detecting a micro-packet in a method such as reference numeral 106 of the method 100 depicted in FIG. 6. The method begins at reference numeral 142. At reference numeral 144, the next control block in the data stream is detected. At reference numeral 146, it is determined whether the control block is a 0x78 /S/ control block. If the control block is not a 0x78 /S/ control block the method returns to reference numeral 144 where the next control block in the data stream is detected.

If at reference numeral 146 it is determined that the control block is a 0x78 /S/ control block, the method proceeds to reference numeral 148 after the entire packet has been received, where it is determined whether the micro-packet has a micro-packet (MP) signature, such as a CRC. If it is determined that the micro-packet does not have a MP signature, such as a CRC, the method returns to reference numeral 144 where the next control block in the data stream is detected.

If it is determined that the micro-packet does have a non-Ethernet signature, such as a CRC, the method ends at reference numeral 150, returning that a micro-packet starting containing POH information has been detected.

Figure 9:
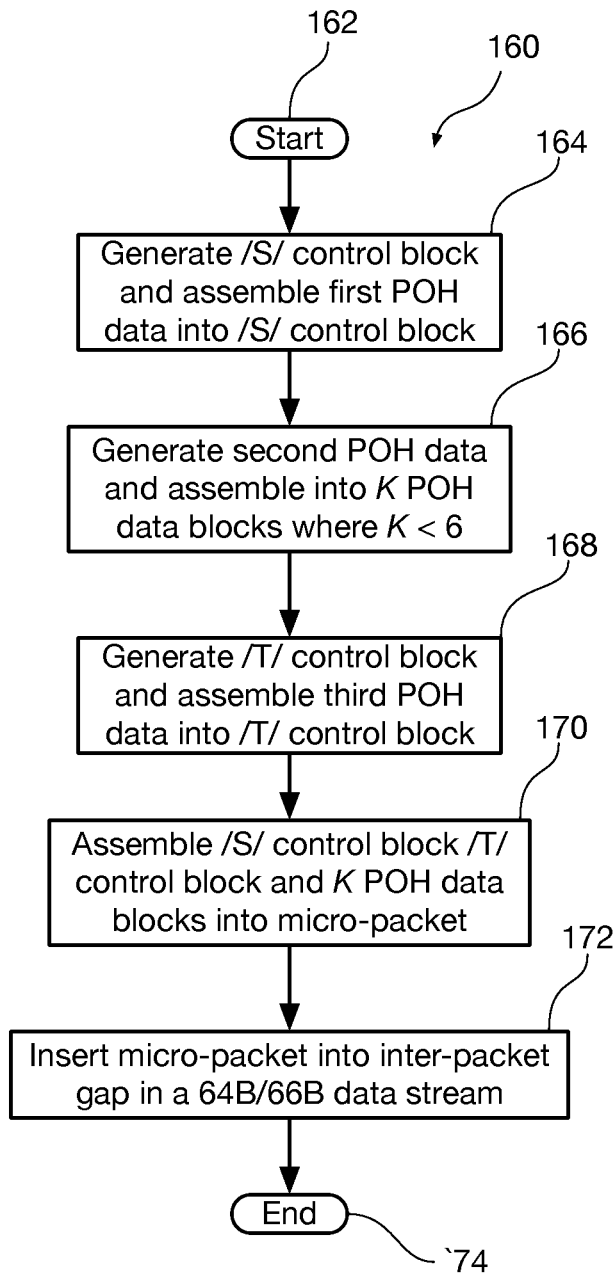
FIG. 9 is a flow diagram showing an illustrative method for inserting path overhead (POH) data blocks into a data stream in a source node of a 64B/66B-block communication link in accordance with an aspect of the present invention.

Referring now to FIG. 9, a flow diagram shows an illustrative method 160 for inserting path overhead (POH) data blocks into a data stream in a source node of a 64B/66B-block communication link in accordance with an aspect of the present invention. The method begins at reference numeral 162 and may be utilized to implement reference number 30 of FIGS. 1 and 2.

At reference numeral 164 an /S/ control block is generated and a first POH data field is assembled into the /S/ control block. At reference numeral 166, second POH data is generated and is assembled into K POH data blocks, where K<6. The choice of K<6 assures that the micro-packet is shorter than the minimum length of an Ethernet packet.

At reference numeral 168, a /T/ control block is generated and a third POH data field is assembled into the /T/ control block.

At reference numeral 170, the /S/ control block, the /T/ control block, and the K POH data blocks are assembled into a micro-packet. At reference numeral 172, the micro-packet is inserted into an inter-packet gap in a 64B/66B data stream. The method ends at reference numeral 174.

Referring now to FIG. 10, a block diagram shows an illustrative apparatus 180 for extracting path overhead (POH) data blocks from a data stream in a 64B/66B-block communication link in accordance with an aspect of the invention. As will be appreciated by persons of ordinary skill in the art, the apparatus 180 of FIG. 10 may be formed as hard logic, state machines, software implementations, or a combination of these elements.

Conceptually, the example apparatus 180 is a receiver that continuously buffers the last K+2 blocks from a received 64B/66B data stream at reference numeral 182 in a K+2 Block FIFO 184. When a micro-packet is detected in the stream in a micro-packet detector 186, the micro-packet is loaded from the K+2 Block FIFO 184 into a POH processor 188 on lines 190, and is replaced in the K+2 Block FIFO 184 by K+2 Idle blocks from K+2 Block generator 192 on lines 194. The output of K+2 Block FIFO 184 is presented on output 196 to PCS block decoder (not shown) as the output 64B/66B data stream, as described at reference number 60 of FIGS. 1, 2.

In FIG. 10, the micro-packet detector 186 is an implementation of reference numeral 106 in FIG. 6, or equivalently, FIG. 7. The POH processor 188 is simply a circuit or processor that interprets the extracted POH information, which is beyond the scope of this invention.

Referring now to FIG. 11, a block diagram shows an illustrative apparatus 200 for inserting path overhead (POH) data blocks into a data stream in a source node of a 64B/66B-block communication link in accordance with an aspect of the invention.

In the circuit shown in FIG. 11, a client stream FIFO 202 receives a 64B/66B data stream on an input line 194. The micro-packet insertion control 206 receives the data stream on line 208 and counts the 64B/66B blocks and detects when it is time to insert the next POH micro-packet (per the selected number of blocks from the first column of FIG. 5). When the micro-packet insertion control 206 then determines that a /T/ is at the FIFO output 210 via line 212, which indicates the transition to an IPG region, it sends a stall command on line 214 to the client stream FIFO 202 which stalls the output of the Client Stream FIFO 202, and on line 216 controls the select input of the data multiplexer 218 to change the source of the output data stream at output 220 from the output 210 of the client stream FIFO 202 to a micro-packet at the output 222 of the micro-packet buffer 224 that had been generated in POH processor 226 that has been presented to micro-packet buffer 224 on lines 228 responsive to a parallel load command from the micro-packet insertion control 206 asserted on line 220. Following transmission of the micro-packet, the micro-packet insertion control 206 controls the data multiplexer 218 using select line 216 to pass the 64B/66B client data stream to the output 220.

Persons of ordinary skill in the art will appreciate that the impact of stalling the output of the FIFO has already been mitigated by the deletion of Idles elsewhere within the PCS.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for extracting path overhead (POH) data blocks from a data stream in a 64B/66B-block communication link, the method comprising:
   receiving at a sink node a data stream in a 64B/66B-block communication link;
   detecting within the data stream at a Physical Coding Sublayer (PCS) sublayer a micro-packet starting with an /S/ control block, including K POH data blocks, and ending with a /T/ control block, the micro-packet having a length shorter than a minimum length for an Ethernet packet, wherein K is less than 6;
   extracting the micro-packet from the data stream; and
   extracting the POH data blocks from the micro-packet.

2. The method of claim 1 further including extracting POH data from byte fields in the /S/ control block and the /T/ control block.

3. The method of claim 1 wherein detecting within the data stream at the PCS sublayer the micro-packet further comprises one of:
   detecting a type 0x78 control block followed by K data blocks that are followed by a type 0xFF control block; and
   detecting a packet including a signature that is different from an Ethernet signature.

4. The method of claim 3 wherein detecting type 0x78 control block followed by K data blocks that are followed by the type 0xFF control block comprises detecting a fixed number of K data blocks.

5. The method of claim 3 wherein detecting the type 0x78 control block followed by K data blocks that are followed by the type 0xFF control block comprises detecting a number of K data blocks wherein K can vary between K=0 and K=5.

6. The method of claim 3 wherein detecting the packet including the signature that is different from the Ethernet signature comprises detecting the packet including a cyclic redundancy check (CRC) that is different from an Ethernet CRC.

7. A method for inserting path overhead (POH) data blocks into a data stream in a source node of a 64B/66B-block communication link, the method comprising:
   generating an /S/ control block including assembling first POH data into the generated /S/control block;
   generating second POH data and assembling the second POH data into K POH data blocks;
   generating a /T/ control block including assembling third POH data into the generated /T/control block;
   assembling the /S/ control block, the K POH data blocks and the /T/ control block into a micro-packet, the micro-packet starting with the /S/ control block and ending with the /T/ control block, the K POH data blocks between the /S/ control block and the /T/ control block, wherein K is less than 6;
   inserting the assembled micro-packet into an inter-packet gap in the data stream in the 64B/66B-block communication link.

8. The method of claim 7 wherein assembling the K POH data blocks between the /S/ control block and the /T/ control block into the micro-packet further comprises including in the micro-packet a signature that is different from an Ethernet signature.

9. The method of claim 8 wherein including in the micro-packet the signature that is different from the Ethernet signature comprises including in the micro-packet a cyclic redundancy check (CRC) that is different from an Ethernet CRC.

10. The method of claim 7 further comprising inserting or deleting idle blocks in the data stream in at least one of a position preceding and following adjacent Ethernet client packets to maintain a data rate in the source node.

11. The method of claim 10 wherein inserting or deleting idle blocks in the data stream comprises inserting or deleting idle blocks in the data stream to match a data rate of the data stream in the source node to a data rate of a section layer connecting the source node to an intermediate node in the 64B/66B-block communication link.

12. An apparatus for extracting path overhead (POH) data blocks from a data stream in a 64B/66B-block communication link, comprising:
   a circuit for receiving at a sink node a data stream in a 64B/66B-block communication link;
   a circuit for detecting within the data stream at a Physical Coding Sublayer (PCS). sublayer a micro-packet starting with an /S/ control block, including K POH data blocks, and ending with a /T/ control block, the micro-packet having a length shorter than a minimum length for an Ethernet packet, wherein K is less than 6;
   circuitry for extracting the micro-packet from the data stream; and
   circuitry for extracting the POH data blocks from the micro-packet.

13. The apparatus of claim 12 wherein the circuitry for extracting the POH data blocks from the micro-packet further extracts POH data from byte fields in the /S/ control block and the /T/ control block.

14. The apparatus of claim 12 wherein the circuit for detecting within the data stream at the PCS sublayer the micro-packet is arranged to one of:
   detect a type 0x78 control block followed by K data blocks that are followed by a type 0xFF control block;
   detect a packet including a signature that is different from an Ethernet signature; and
   detect a packet having a length shorter than the minimum length for an Ethernet packet.

15. An apparatus for inserting path overhead (POH) data blocks into a data stream in a source node of a 64B/66B-block communication link, comprising:
   circuitry arranged to:
   generate an /S/ control block including first POH data;
   generate a /T/ control block including generating second POH data;
   assemble third POH data into K 64B/66B blocks; and
   assemble the K POH data blocks between the /S/ control block and the /T/ control block into a micro-packet, where K is less than 6; and
   a circuit arranged to insert the assembled micro-packet into an inter-packet gap in the data stream in the 64B/66B-block communication link.

* * * * *